(12) United States Patent
Bairashewski et al.

(10) Patent No.: US 10,473,811 B1
(45) Date of Patent: Nov. 12, 2019

(54) MULTI-MODAL SCANNER WITH METAL DETECTOR FOR DEFINING X-RAY SCAN REGION OF A HUMAN BODY

(71) Applicant: ADANI Systems, Inc., Alexandria, VA (US)

(72) Inventors: Dzmitryi Bairashewski, Minsk (BY); Vladimir N. Linev, Minsk (BY)

(73) Assignee: Adani Systems, Inc., Alexandria, VA (US)

( * ) Notice: Subject to any disclaimer, the term of this patent is extended or adjusted under 35 U.S.C. 154(b) by 0 days.

(21) Appl. No.: 16/033,750

(22) Filed: Jul. 12, 2018

(51) Int. Cl.
*G01V 5/00* (2006.01)
(52) U.S. Cl.
CPC ................... *G01V 5/0016* (2013.01)
(58) Field of Classification Search
CPC .................................................. G01V 5/0075
See application file for complete search history.

(56) References Cited

U.S. PATENT DOCUMENTS

| | | | | |
|---|---|---|---|---|
| 2005/0058242 | A1* | 3/2005 | Peschmann | G01V 5/0016 378/57 |
| 2006/0083346 | A1* | 4/2006 | Schlomka | G01V 5/0025 378/57 |
| 2016/0051211 | A1* | 2/2016 | Linev | G01V 5/0058 378/62 |

* cited by examiner

*Primary Examiner* — Chih-Cheng Kao
(74) *Attorney, Agent, or Firm* — Bardmesser Law Group

(57) ABSTRACT

Multi-modal scanner with metal detector for defining an X-ray scan region of a human body with a metal object includes an X-ray source; adjustable collimator outputting a fan-shaped X-ray beam from the X-ray source; an X-ray detector detecting the X-ray beam after passing through a human body; a metal detector adapted to identify an area with the metallic object; and a processor controlling the X-ray source, the adjustable collimator and the metal detector, and changing an aperture of the collimator to limit the fan-shaped X-ray beam to the identified area of the human body. Visual indicators (LEDs) are on a frame of the scanner for indicating the area of the human body with the metallic object. The collimator includes two lead plates that are moved vertically automatically upon detection of the metallic object to direct the fan-shaped X-ray beam to only the area of the human body with the metal.

5 Claims, 8 Drawing Sheets

MULTI-MODAL SCANNER WITH METAL DETECTOR FOR DEFINING X-RAY SCAN REGION OF A HUMAN BODY

BACKGROUND OF THE INVENTION

Field of the Invention

The invention relates to X-ray scanning systems, and, more particularly, to a system for human body scanning that uses a metal detector to narrow down an area for X-ray scanning.

Description of the Related Art

The use of X-ray scanners has spread in recent years, given the emphasis on physical security and contraband traffic control at many transportation choke points, such as airports. At the same time, using human X-ray scanners is not always justified or is restricted, as people get exposed to radiation during scans. According to the US ANSI 43.17-2009 standard, human X-ray scanners cannot produce radiation doses that exceed 0.25 μSv per scan pass, otherwise they are subject to more extensive control, and the operator has to account for the cumulative dose over a series of scans for each subject.

Today, conventional X-ray scanners usually expose a person to up to 0.25-5 μSv per scan pass. The ANSI 43.17-2009 standard defines this mode as of LIMITED USE, meaning that it requires the cumulative dose to be accounted for, and therefore all such systems have to be combined into a single, country-wide network. As for the doses of less than 0.25 μSv, the ANSI 43.17-2009 standard allows X-ray scans to be carried out without the need for knowing the person's exposure history. The main problem here is that at such small doses (less than 0.25 μSv), image quality may not be enough for proper analysis. Thus, there is a limit to how low a dose can be used for a full body X-ray scan of a human.

Accordingly, there is a need in the art for a scanner that reduces the radiation dose during the scan, and to improve image quality while also greatly reducing personal X-ray exposure.

SUMMARY OF THE INVENTION

The invention relates to a multi-modal X-Ray scanner with metal detector for defining an X-ray scan region of a human body with a suspicious metal object that substantially obviates one or more disadvantages of the related art.

In an exemplary embodiment, a full-body scanner includes an X-ray source; an adjustable collimator outputting a fan-shaped X-ray beam from the X-ray source; an X-ray detector detecting the X-ray beam after it passes through a human body; a metal detector responsive to a metallic object on the human body and adapted to identify an area of the human body with the metallic object; and a processor controlling the X-ray source, the adjustable collimator and the metal detector, the processor changing an aperture of the collimator to limit the fan-shaped X-ray beam to the identified area of the human body.

Visual indicators (such as LEDs that light up) can be positioned on a frame of the scanner for indicating the area of the human body with the metallic object. The adjustable collimator includes two beam limiting shutters, for example, made of lead. The two shutters are moved automatically to limit X-ray beam in vertical plane, under control of the processor, upon detection of the metallic object on the human body to direct the fan-shaped X-ray beam to only the area of the human body. The area for X-ray scan and exposure is typically no more than about ⅓ of the human body, e.g., 1.5-2.0 feet in vertical dimension. This way, the radiation received (effective dose) by the selected human body part is lower than when the X-ray source puts out a total of 0.25 μSv for the whole body. The radiation received depends on the part of the body irradiated, X-ray beam vertical limits and can be several times lower than full body irradiation dose.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
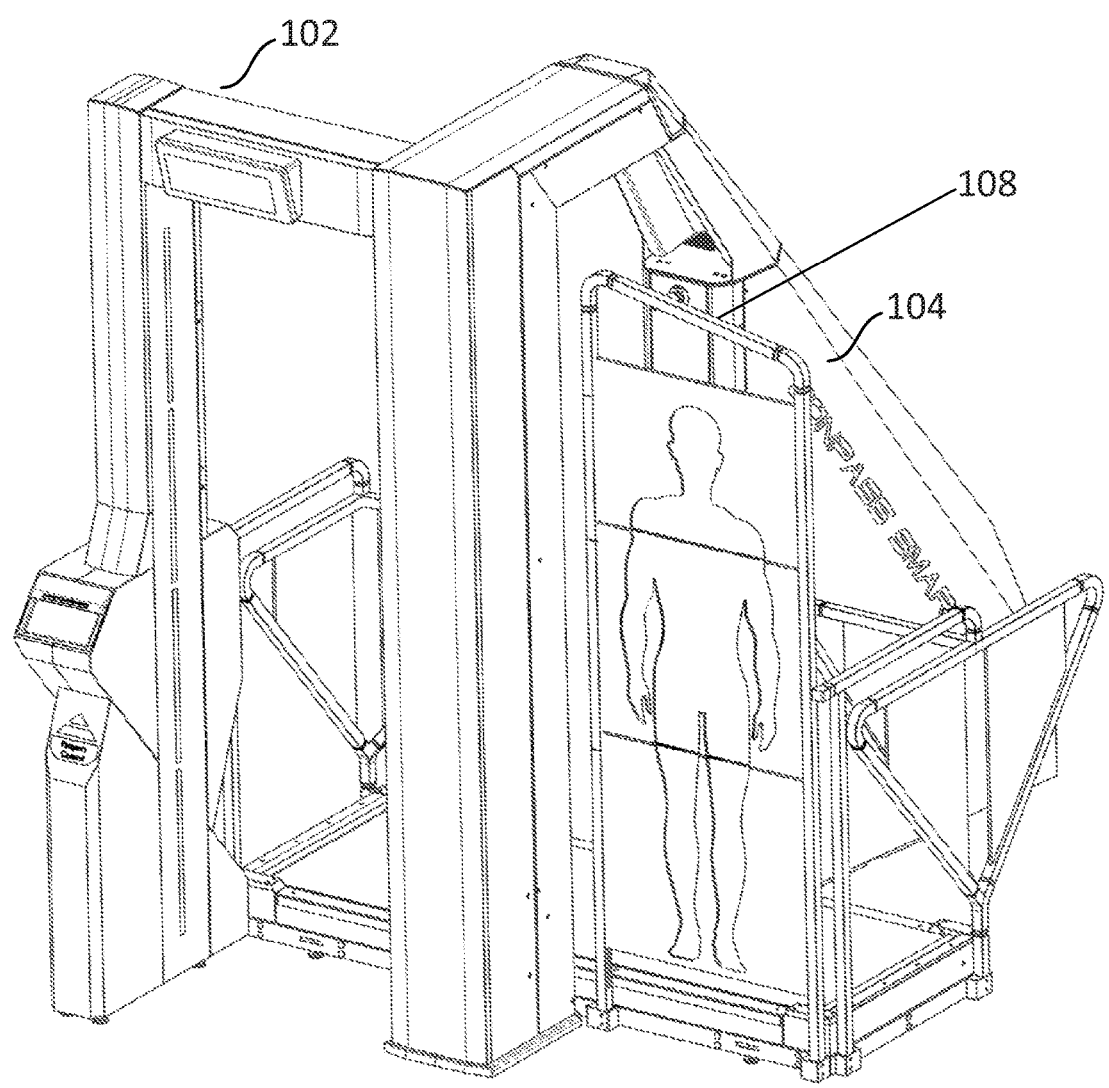
FIGS. 1A-1F illustrate different isometric views of one embodiment of the scanner.
Figure 1B:
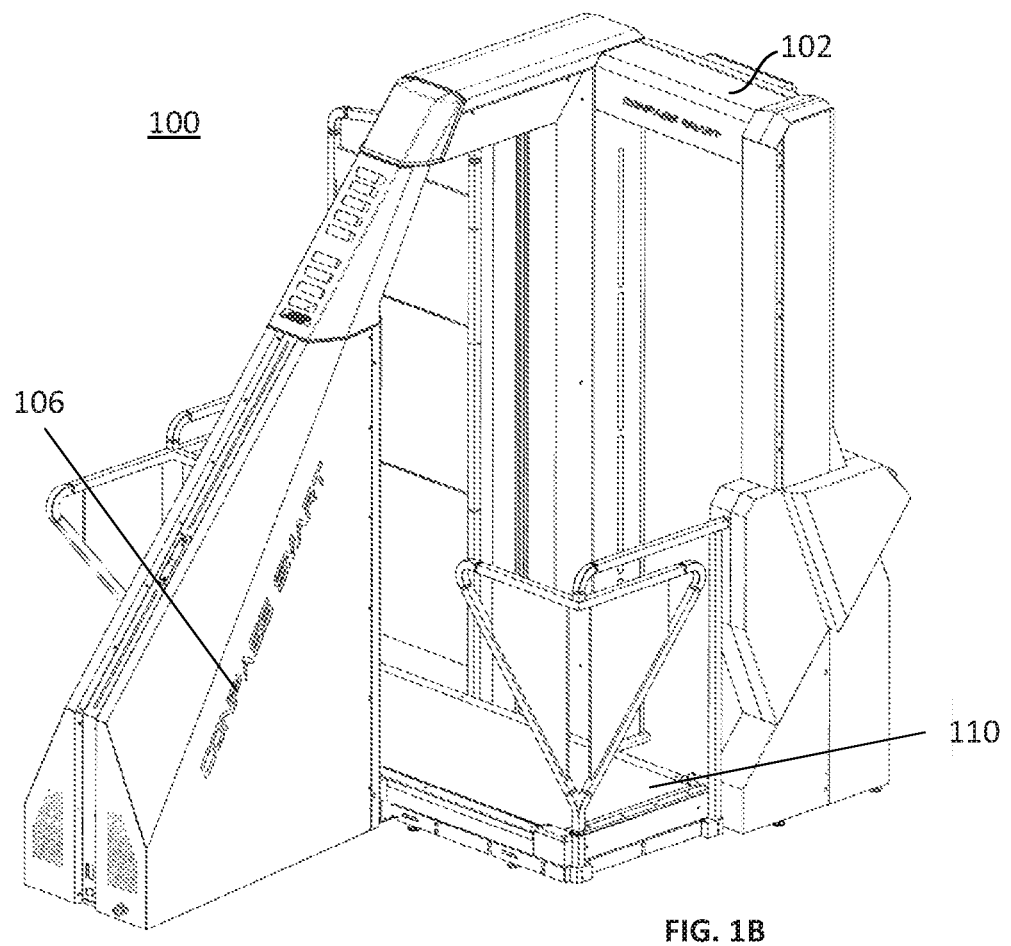
Figure 1C:
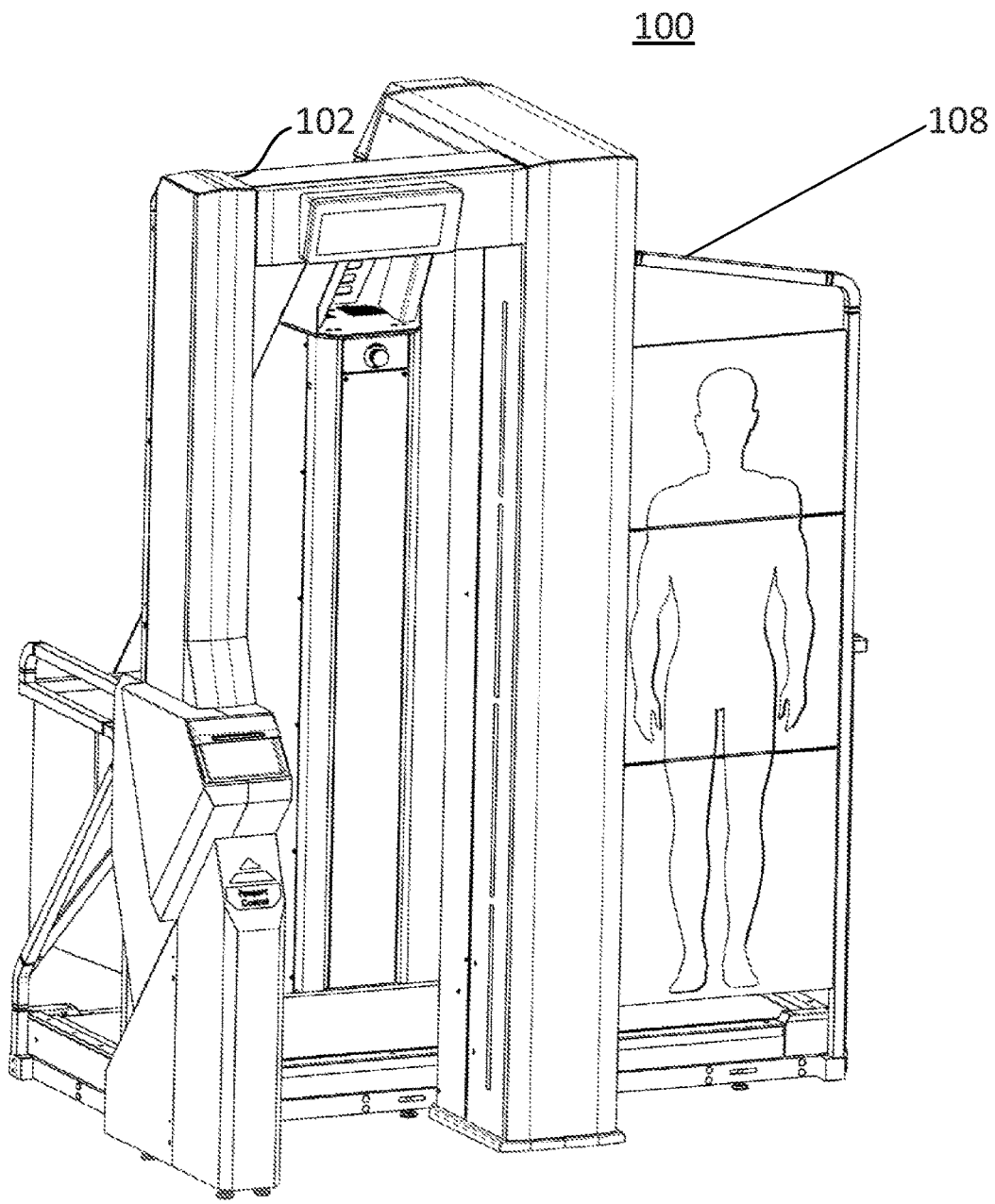
Figure 1D:
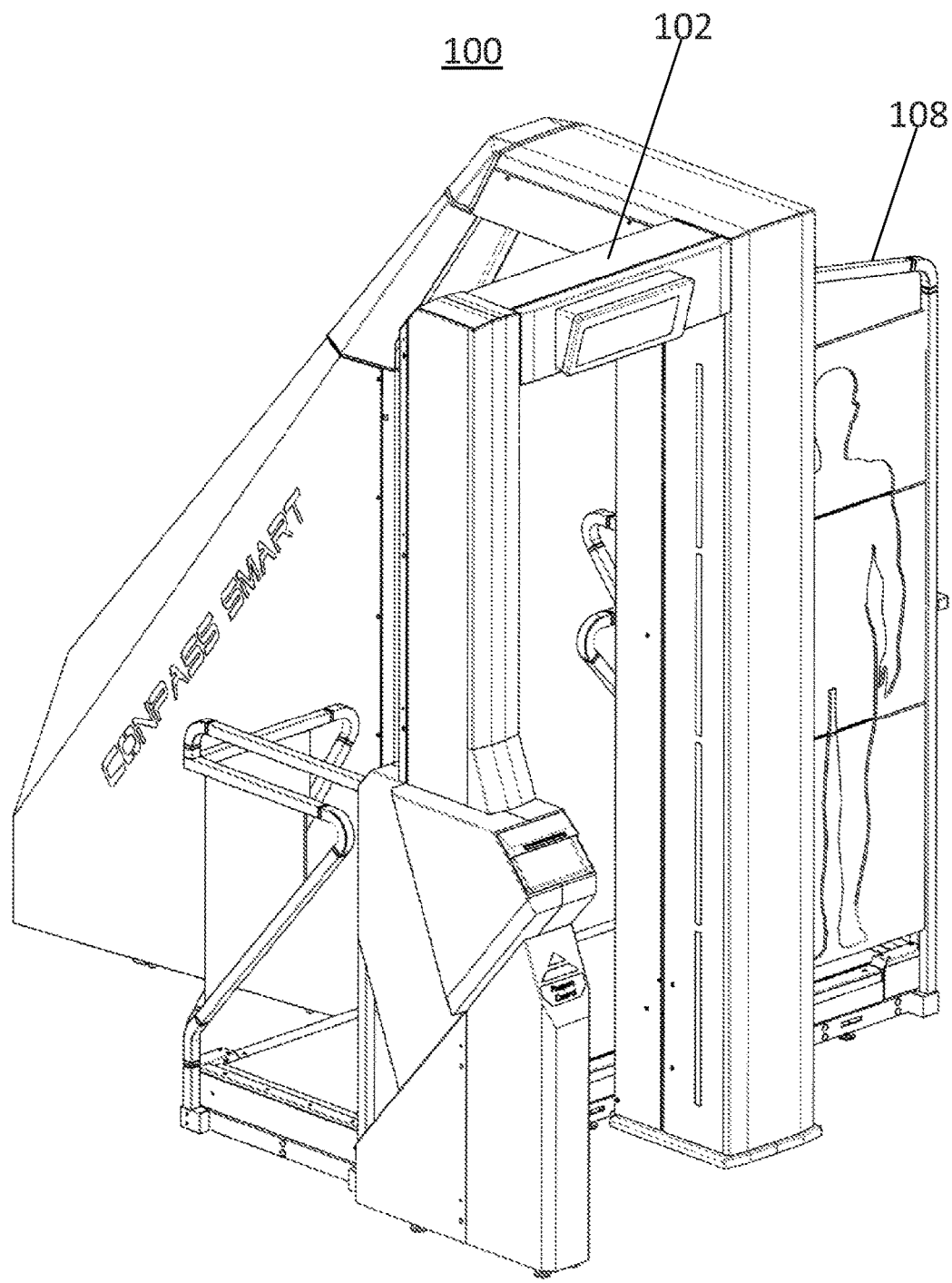
Figure 1E:
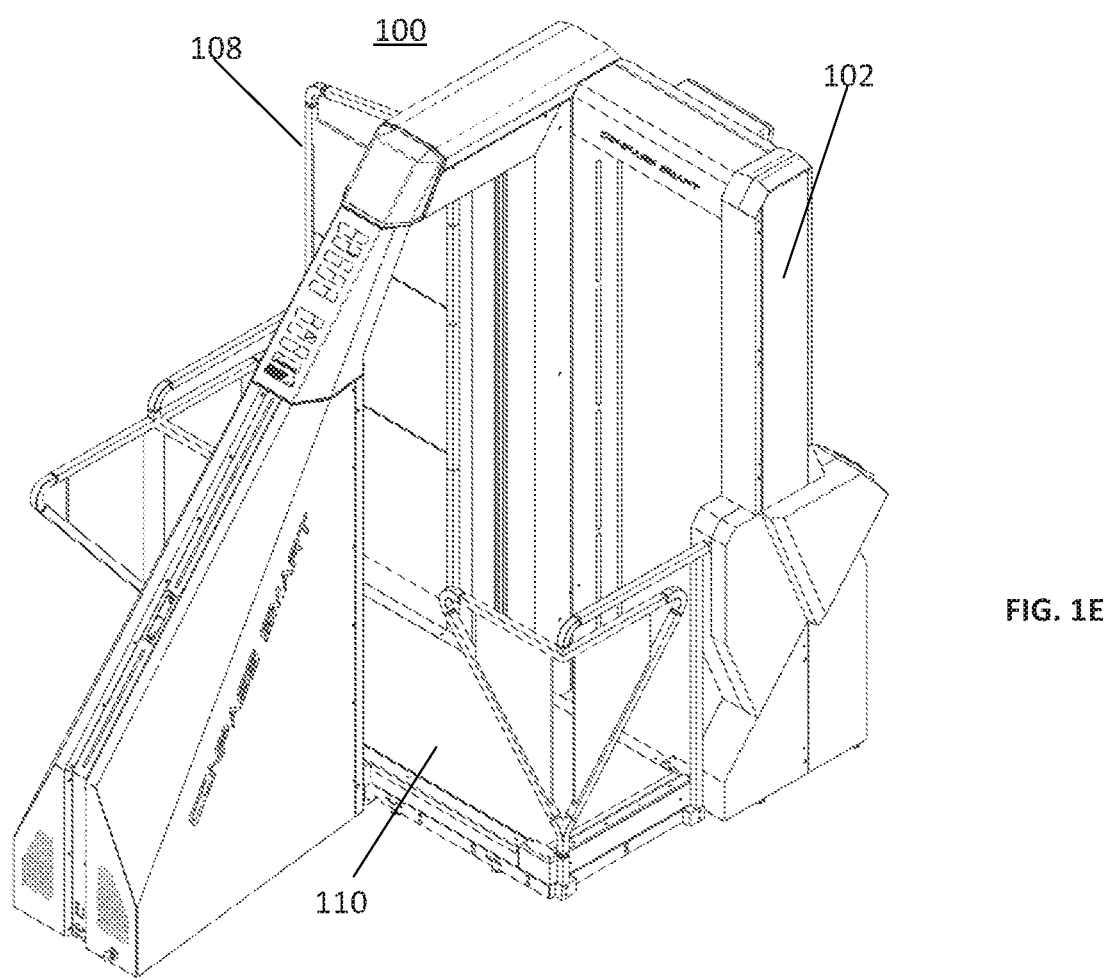
Figure 1F:
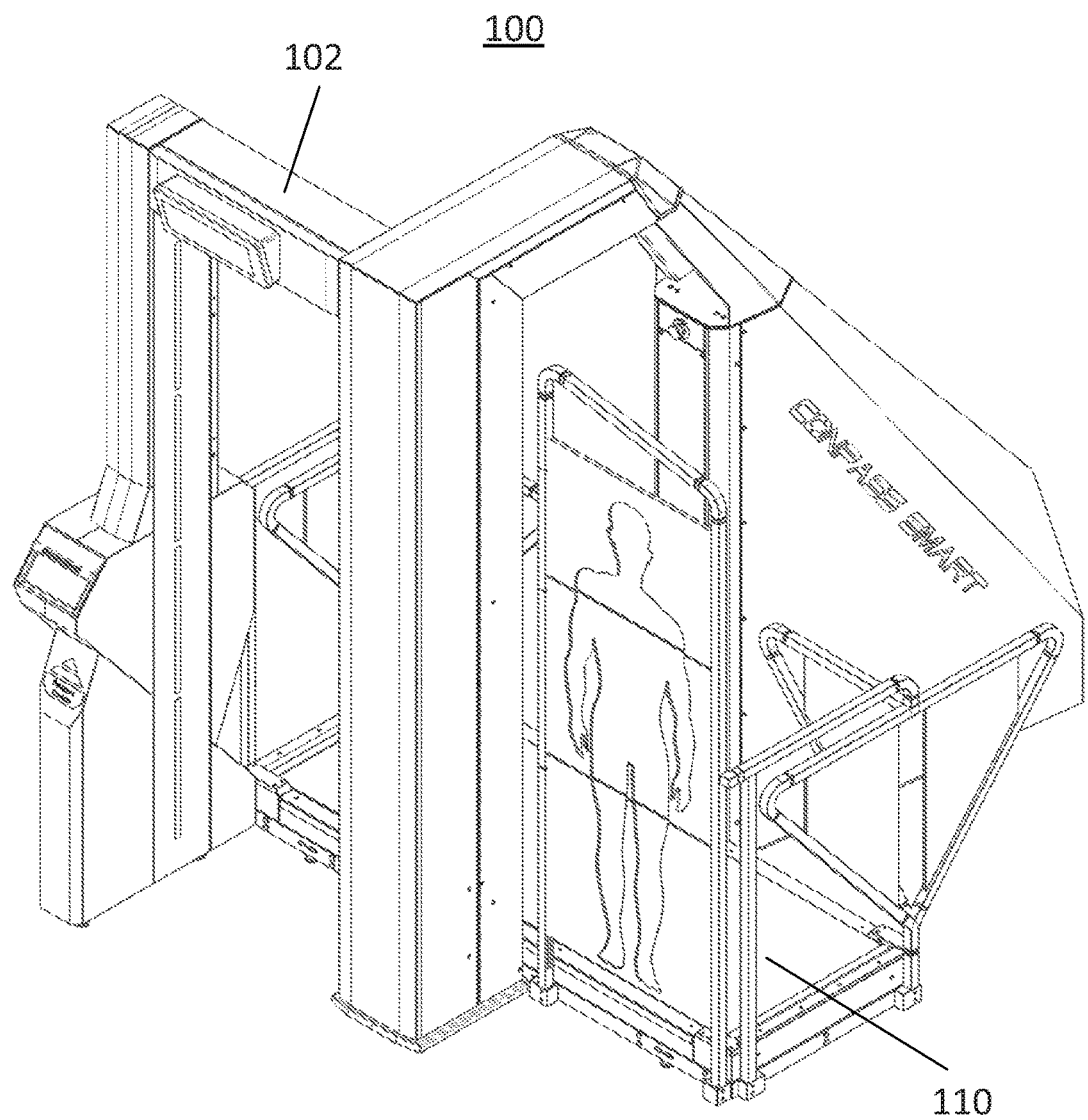
Figure 2:
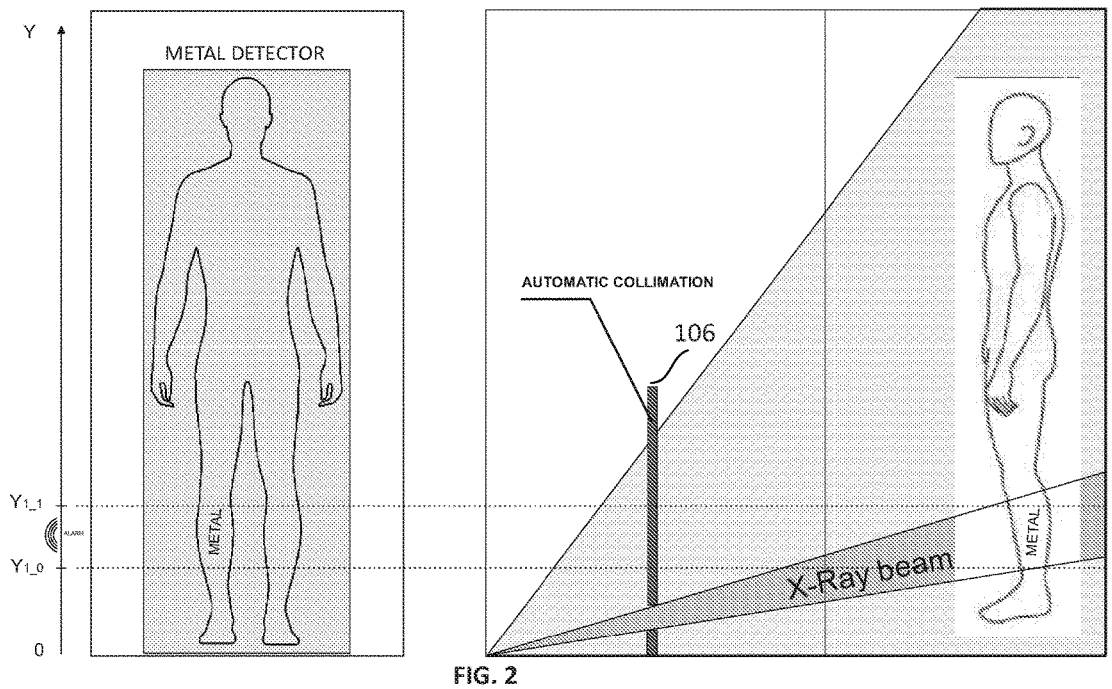
FIG. 2 illustrates operation of the collimator to limit radiation exposure.
Figure 3:
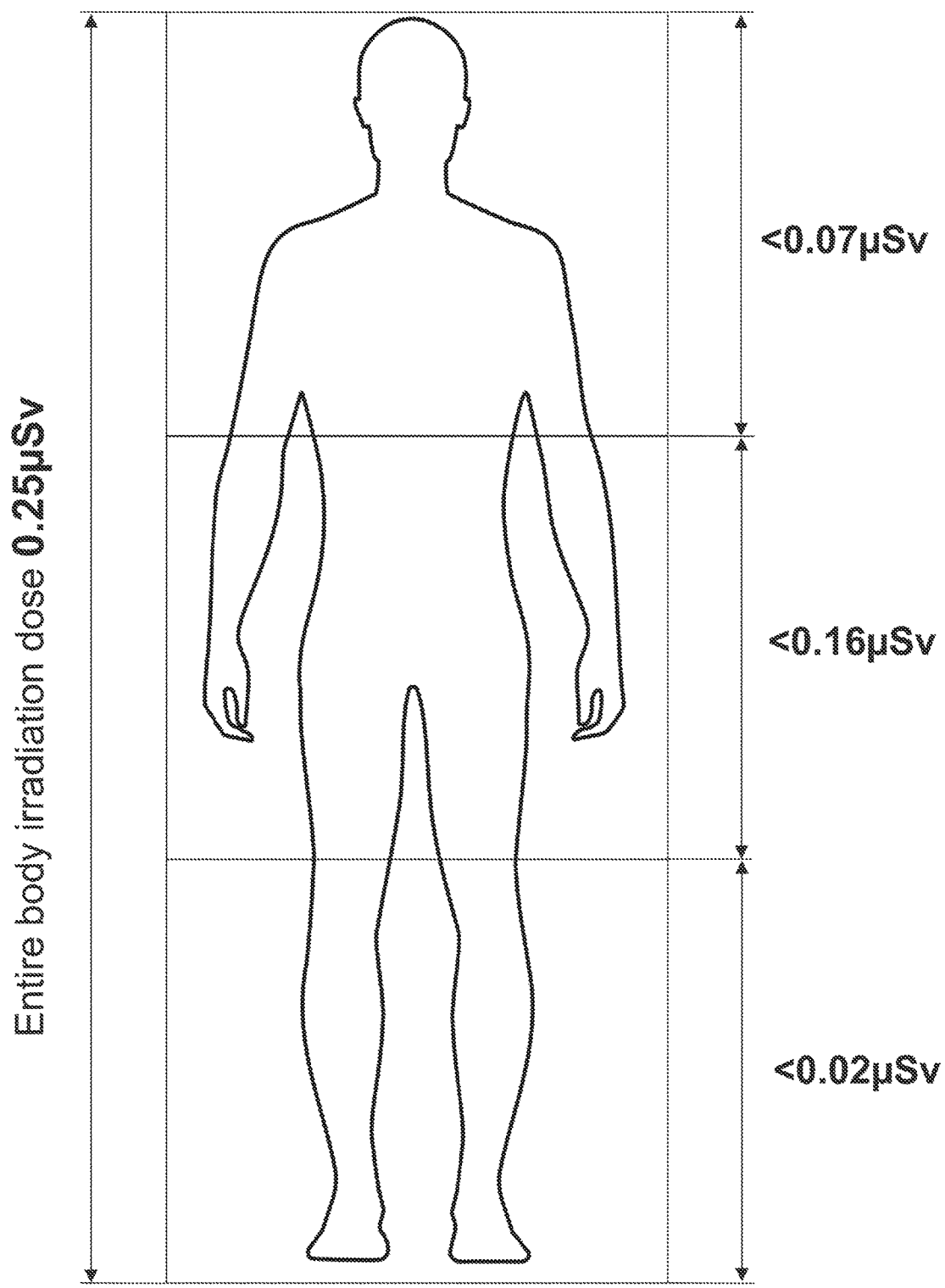
FIG. 3 illustrates distribution of radiation exposure of a typical human body.

FIGS. 1A-1F illustrate different isometric views of one embodiment of the scanner 100. FIG. 2 illustrates operation of the collimator to limit radiation exposure. FIG. 3 illustrates distribution of radiation exposure of a typical human body. In the figures, 100 is the scanner, 102 is the metal detector, 104 is the X-ray scanning component, 106 is the collimator (hidden by the housing in some of the figures), 108 is the display, and 110 is the moving platform.

The present invention allows to greatly reduce the human's exposure to radiation during X-ray scanning without compromising on X-ray image quality, or to improve image quality while keeping the radiation exposure at the same level. This result is achieved through segmented scanning—only suspicious areas that may contain metallic objects detected by a metal detector are scanned—and through selection of optimum generator settings for the given area. In the worst-case scenario, when a person is "suspicious" from head to toes, they will get the same exposure as during a regular X-ray body scan—but this is expected to be a rare case.

The procedure of search using the present invention comprises the following steps:

1. The person passes through a metal detector frame.

2. The metal detector detects metallic objects on or inside the person and automatically determines vertical limits of suspicious areas (this is generally done, for example, by using multiple magnetic coils and, with the vertical dimension being divided into some number of areas—e.g., 3 or more) detecting which coil is experiencing a change in magnetic parameters), also highlighting them for visual display to an operator. As another possibility, there may be multiple metallic objects detected on the body, and the entire body needs scanning.

In the figure, the suspicious window is located between $Y_{1\_0}$ and $Y_{1\_1}$ 3. The human X-ray scanner automatically obtains the vertical coordinates of suspicious windows ($Y_{1\_0}$ and $Y_{1\_1}$) that may contain metallic objects that have been detected and thus limits the area to be scanned using shutters on the X-ray collimators (essentially, lead plates that are moved in a way to limit X-ray beam in vertical plane).

4. Depending on the scanning settings (Minimum Dose or High Quality), the system automatically calculates and controls the operation of the X-ray generator. At Minimum Dose settings, the generator will never generate a radiation dose exceeding 0.25 µSv in full-body scanning. Alternatively, at High Quality settings, the dose generated would exceed 0.25 µSv if the entire body were scanned, but in fact does not exceed 0.25 µSv, since only a small scanning window is employed.

Therefore, the person undergoing such X-ray scanning will be exposed to radiation doses that are less than 0.25 µSv by a factor of several X, or to radiation providing 0.25 µSv, but with the image quality which is several times better, depending on the scanning settings.

The following sequence of using an X-ray scanner in combination with a metal detector provides for the result of high quality images with low radiation doses:

(1) A person is searched using a metal detector;

(2) The metal detector is able to detect metallic objects present on or inside the person's body;

(3) In case there are any metallic objects on or inside the person's body, the software of the complex registers vertical coordinates of the area(s) that may contain the metallic objects that have been detected;

(4) In case the metallic object cannot be identified visually or by patting down the person, the X-ray scanner is used;

(5) The window(s) to be scanned are limited vertically, based on the registered coordinates of the area of the person's body, where the metallic object has been detected. This is done to reduce X-ray exposure, which cannot be achieved without using a metal detector in combination with a full-height X-ray scanner;

(6) The scanning mode (including scanning time, X-ray tube current and voltage) is selected based on the scanned window. This is done to maximize image quality while minimizing X-ray exposure. For instance, smaller doses of radiation are required when scanning legs than when scanning the abdominal cavity. Therefore, if an illegal object has been detected on or inside a person's leg, X-ray exposure can be greatly reduced;

(7) The localized window is scanned with an X-ray beam, producing an X-ray image.

Example 1. Set of Parameters for the Low Dose Mode

When scanning the entire human body, the radiation generator is set to 160 kV, 0.3 mA and full body irradiation dose is about 0.25 µSv with these generator settings.

Having shrunk the scanned window by a factor of three, the generator/X-ray source settings can stay the same, while the resulting dose is reduced by a factor that depends on the part of the body being irradiated, X-ray beam vertical limits and can be several times lower than full body irradiation dose. For example, when irradiating head or legs area only—irradiation dose reduces to less than 0.1 µSv. Approximate dose distribution depending on the part of the body is shown on FIG. 3.

Example 2. Set of Parameters for the High Quality Mode

When scanning the entire human body, the radiation generator is set to 160 kV, 0.3 mA and full body irradiation dose is about 0.25 µSv with these generator settings. The X-ray detector registers 30% X-ray signal level with these generator settings.

Having shrunk the scanned window by a factor of three, the same radiation dose (in certain conditions) is kept by increasing the power of radiation by a factor of three, while improving image quality. The X-ray detector signal level increases up to 90%, increasing x-ray penetration and signal to noise ratio.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A full-body scanner, comprising:
   an X-ray source;
   an adjustable collimator outputting a fan-shaped X-ray beam from the X-ray source;
   an X-ray detector detecting the X-ray beam after the X-ray beam passes through a human body;
   a metal detector responsive to a metallic object on the human body and adapted to identify an area of the human body with the metallic object;
   a processor controlling the X-ray source, the adjustable collimator and the metal detector, the processor changing an aperture of the collimator to limit the fan-shaped X-ray beam to the identified area of the human body.

2. The scanner of claim 1, further comprising visual indicators on a frame of the scanner for indicating the area of the human body with the metallic object.

3. The scanner of claim 1, wherein the adjustable collimator includes two shutters limiting the fan-shaped X-ray beam in a vertical plane.

4. The scanner of claim 3, wherein the two X-ray beam limiting shutters are moved automatically, under control of the processor, upon detection of the metallic object on the human body to direct the fan-shaped X-ray beam to only the area of the human body.

5. The scanner of claim 1, wherein a radiation received by the human body during a scan is reduced below 0.1 microSieverts.

* * * * *